(12) United States Patent
Didio-Sayer (10) Patent No.: US 6,202,638 B1
(45) Date of Patent: Mar. 20, 2001

(54) GRILL COVER

(76) Inventor: Debbie Didio-Sayer, 62 John Street, Weston, Ontario (CA), M6M 1J8

( * ) Notice: Subject to any disclaimer, the term of this patent is extended or adjusted under 35 U.S.C. 154(b) by 0 days.

(21) Appl. No.: 09/200,432

(22) Filed: Nov. 27, 1998

(51) Int. Cl.⁷ ............................................. A47J 37/00
(52) U.S. Cl. ............................ 126/25 AA; 126/299 C; 126/299 D; 126/299 F
(58) Field of Search ......................... 126/1 R, 300, 126/299 R, 299 D, 299 F, 299 C, 25 AA, 21 R, 273 R, 275 R, 25 R; 99/421 H, 450, 645; 220/369

(56) References Cited

U.S. PATENT DOCUMENTS

| | | |
|---|---|---|
| D. 327,538 | 6/1992 | Falk et al. . |
| 1,069,390 * | 8/1913 | Connolly ........................ 126/299 C |
| 1,190,584 * | 7/1916 | Reese ............................. 126/299 C |
| 1,338,378 * | 4/1920 | Larson ........................... 126/299 C |
| 1,706,389 | 3/1929 | Bayliss . |
| 1,764,954 | 6/1930 | Hentschel . |
| 1,807,271 * | 5/1931 | Asadoorian ..................... 126/299 C |
| 1,877,240 | 9/1932 | Hentschel . |
| 2,024,359 | 12/1935 | Hentschel . |
| 2,051,710 | 8/1936 | Hentschel . |
| 2,329,853 | 9/1943 | Ring . |
| 4,046,132 | 9/1977 | White . |
| 4,256,080 * | 3/1981 | Seach ............................. 126/25 R |
| 4,287,870 | 9/1981 | Johnson . |
| 4,321,857 * | 3/1982 | Best ............................... 99/421 H |
| 4,418,678 | 12/1983 | Erickson . |
| 4,498,452 * | 2/1985 | Schlosser et al. ............... 126/25 R |
| 4,770,091 * | 9/1988 | Vaughn ........................... 99/421 H |
| 4,884,499 | 12/1989 | Rensch et al. . |
| 4,934,337 | 6/1990 | Falk . |
| 5,279,279 | 1/1994 | White . |
| 5,481,967 * | 1/1996 | Chen ............................... 99/645 |
| 5,531,354 * | 7/1996 | Uy .................................. 126/299 C |
| 5,782,166 * | 7/1998 | Lin ................................. 126/25 R |
| 6,021,708 * | 2/2000 | Hoglund ......................... 99/421 H |

FOREIGN PATENT DOCUMENTS

955434 * 1/1950 (FR) ................................ 126/275 R

OTHER PUBLICATIONS

Jenn–Air Range Brochure (date unknown), p. 7 (Rotiss–Kebab Model A312).

* cited by examiner

*Primary Examiner*—Ira S. Lazarus
*Assistant Examiner*—Sara Clarke
(74) *Attorney, Agent, or Firm*—Bereskin & Parr (57) ABSTRACT

A cover for a grill equipped with a downdraft ventilator. The cover includes a heat resistant enclosure having a bottom edge that sufficiently encloses the grill to contain smoke and splatter generated during cooking. A vent opening is defined in the enclosure at a position that permits smoke to be drawn from the enclosed space into the downdraft ventilator.

17 Claims, 10 Drawing Sheets

GRILL COVER

FIELD OF THE INVENTION

The present invention relates to cooking accessories and in particular to a grill cover for grills having a downdraft ventilator.

FIELD OF THE INVENTION

Indoor grills have become increasingly popular for those who wish to enjoy grilled food in all seasons. Such grills may utilize a gas or electric heating source and typically include an electrically powered downdraft ventilator with an opening located along one side of the grill at the same height or slightly raised above the grill surface. The ventilator draws smoke into the opening so that it may be filtered or discharged outdoors.

One problem with such indoor grills is that grease tends to splatter away from the grill during the grilling process. Also, the grilling process can be prolonged due to the escape of heat resulting in added time required to fully heat (and therefore cook) the food. Outdoor barbecue grills address these problems by providing a cover for the grilling surface but no adequate solution has been provided for indoor grills.

One attempt to address the problem with indoor grills is disclosed in U.S. Pat. No. 5,279,279 (White) directed to a deflector for blocking splatter and heat loss for a downdraft ventilated grill. The White device does not provide a sufficient amount of coverage of the grill surface for containing heat and catching splatter during the cooking process.

What is needed is an improved cover for a grill having a downdraft ventilator.

SUMMARY OF THE INVENTION

A cover for a grill equipped with a downdraft ventilator, said cover comprising:

In one aspect the invention provides a cover for a grill, where the grill is equipped with a downdraft ventilator, said cover comprising:

a heat resistant enclosure having a lid and a base, said lid being removably connected to said base, said enclosure being sized to enclose a sufficient portion of a grill surface of a grill to contain smoke and splatter generated during cooking, said grill surface remaining exposed within said enclosure to permit cooking thereon; and a vent defined in said enclosure at a position to permit a downdraft ventilator to draw away smoke from the space within the enclosure.

In another aspect the invention provides a grill and grill cover combination for a grill equipped with a downdraft ventilator, said grill cover comprising:

a heat resistant enclosure having a lid and a base, said enclosure bring sized to enclose a sufficient portion of a surface of the grill to contain smoke and splatter generated during cooking; and a vent defined in said enclosure at a position to permit the downdraft ventilator to draw away smoke from the space within the enclosure.

BRIEF DESCRIPTION OF THE DRAWINGS

For a better understanding of the present invention, and to show more clearly how it may be carried into effect, reference will now be made, by way of example, to the accompanying drawings. The drawings show preferred embodiments of the present invention, in which.

DETAILED DESCRIPTION OF THE PREFERRED EMBODIMENT

A grill cover in accordance with the present invention is shown generally at 20 in the figures. The cover is designed for use with an appliance 22 having a grill 24 that is ventilated with a downdraft ventilator 26. The ventilator is typically electrically powered to create a sufficiently strong vacuum to draw smoke (which may include other by-products associated with the grilling process) away from the grill 24 and into the opening 28 of the ventilator. The smoke is then discharged through a vent pipe (not shown) outdoors or it is filtered from the drawn air and the resulting clean air is discharged indoors. The ventilator is typically positioned along one elongate side 30 of the grill 24 at a height that is generally flush with or slightly raised above the surface of the grill 24.

The grill 24 is heated with either a gas flame or an electric heating source and may include lava rocks or other means below the grill surface to retain and distribute heat and catch fat drippings from food being cooked on or over the grill 24. The term "grill" is also defined herein to include any other cooking surface such as a hot plate or radiant element that is ventilated using a downdraft ventilator.

The cover includes an enclosure 31 that defines an enclosed space 32 for containing heat and smoke and preventing the splatter of grease from the grill 24. The enclosure 31 is formed from a heat resistant material, such as metal, so as not to be affected by the temperatures given off by the grill 24. The enclosed space 32 is sized sufficiently to enclose a substantial portion of the surface of the grill 24 and to provide air circulation about the food being cooked on the grill 24.

A vent 38 is defined in the enclosure 31 at a position to permit an airflow 40 generated by the downdraft ventilator 26 to draw smoke from the enclosed space 32 into the opening 28 of the ventilator. The vent 38 may be configured with vertical slots 64, horizontal slots, circular apertures or apertures of any other shape that allow an airflow 40 to pass between the enclosed space 32 and the ventilator.

Referring in particular to the preferred embodiment of cover depicted in FIGS. 1–4, the enclosure 31 includes a base 34 and a lid 36. The base 34 includes vertical end walls 50 and vertical side walls 51 that together extend about the perimeter 52 of the grill 24. The walls have a flat bottom edge 54 that contacts the surface 56 of the appliance 22 surrounding the grill 24 to create a sufficient seal to prevent smoke from passing beneath the bottom edge. The base 34 includes support flanges 58 mounted by welds, rivets or other fastening means 60 to the inner surface of the vertical walls adjacent to the top edge 62 of the base 34 to support the lid 36. The vent 38 comprises a plurality of vertical slots 64 defined in the vertical side wall 50 for positioning adjacent to the downdraft ventilator 26.

A vent cover 66 is mounted to the vented vertical side wall 51 to open or close the vent 38 as desired (for instance to allow smoke to accumulate and flavour the food before the vent cover 66 is opened and the smoke is gathered by the ventilator). The vent cover 66 includes a panel 68 that is movably mounted with brackets 70 secured by welds, rivets, screws or bolt fasteners 71 to the inner surface of the vertical side wall 51. Tabs 72 extend outwardly from the vertical end walls 50 through slots 74. The slots 74 include notches 76 for locking the tabs 72 in a desired position.

The lid 36 has an inverted bowl shaped body 80 with a protruding lip 82 defining a flat bottom edge 84 for resting on the support flanges 58 of the base 34. The lid 36 is sized to fit sufficiently close within the base 34 so as to substantially contain smoke from passing between the lid 36 and the base 34. The lid 36 also includes a handle 86 secured to the lid 36 by nut and bolt fasteners 88 or other suitable fasteners such as screw fasteners, welds or rivets.

The cover is equipped with a rotisserie mechanism 90 which includes an electric rotor (not shown) contained within a rotor housing 92. A spit 94 has a first end 96 that is removably connected to the rotor such that the rotor causes the spit 94 to rotate about its axis. A second end 98 of the spit 94 is sharpened for piercing a food product 99. The spit 94 extends between opposing vertical end walls 50 of the base 34 and extends through an aperture 100 sized to permit rotation of the spit 94 within the aperture 100. The spit 94 is also equipped with tines 102 that are mounted to a collar 104 that is slidably connected to the spit 94. The collar 104 may be releasely locked into a desired position with a set screw 106 or other suitable fastener for forming a friction fit with the spit 94. The tines 102 may be positioned to engage opposing sides of the food that has been placed on the spit 94 in order to cause the food to rotate in response to rotation of the spit 94.

Referring to FIGS. 5 to 11, further embodiments of the cover in accordance with the present invention are shown. For convenience, the same reference numbers have been given to elements that correspond to elements described above.

Figure 1:
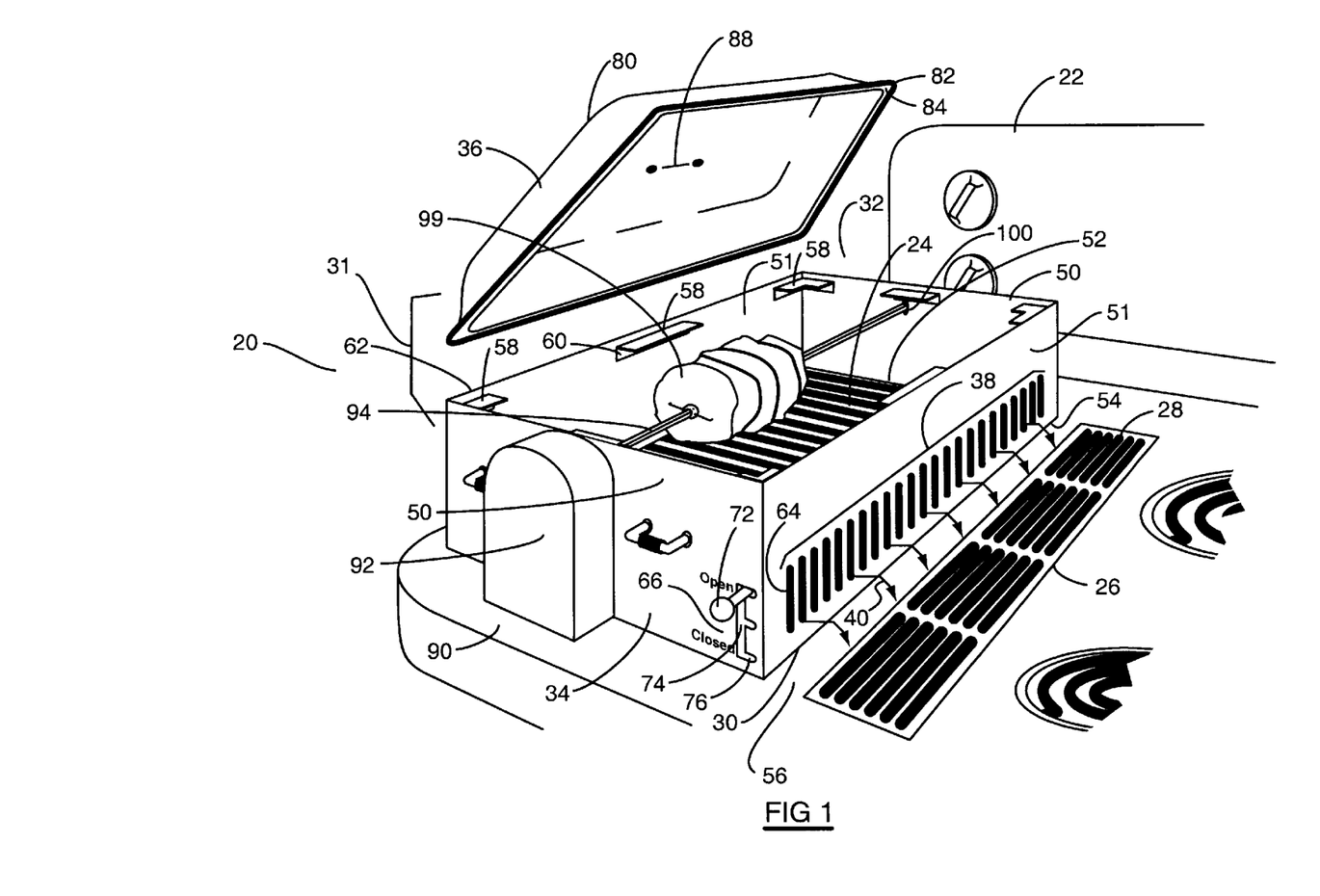
FIG. 1 is a perspective view of a grill cover in accordance with the present invention.
Figure 2:
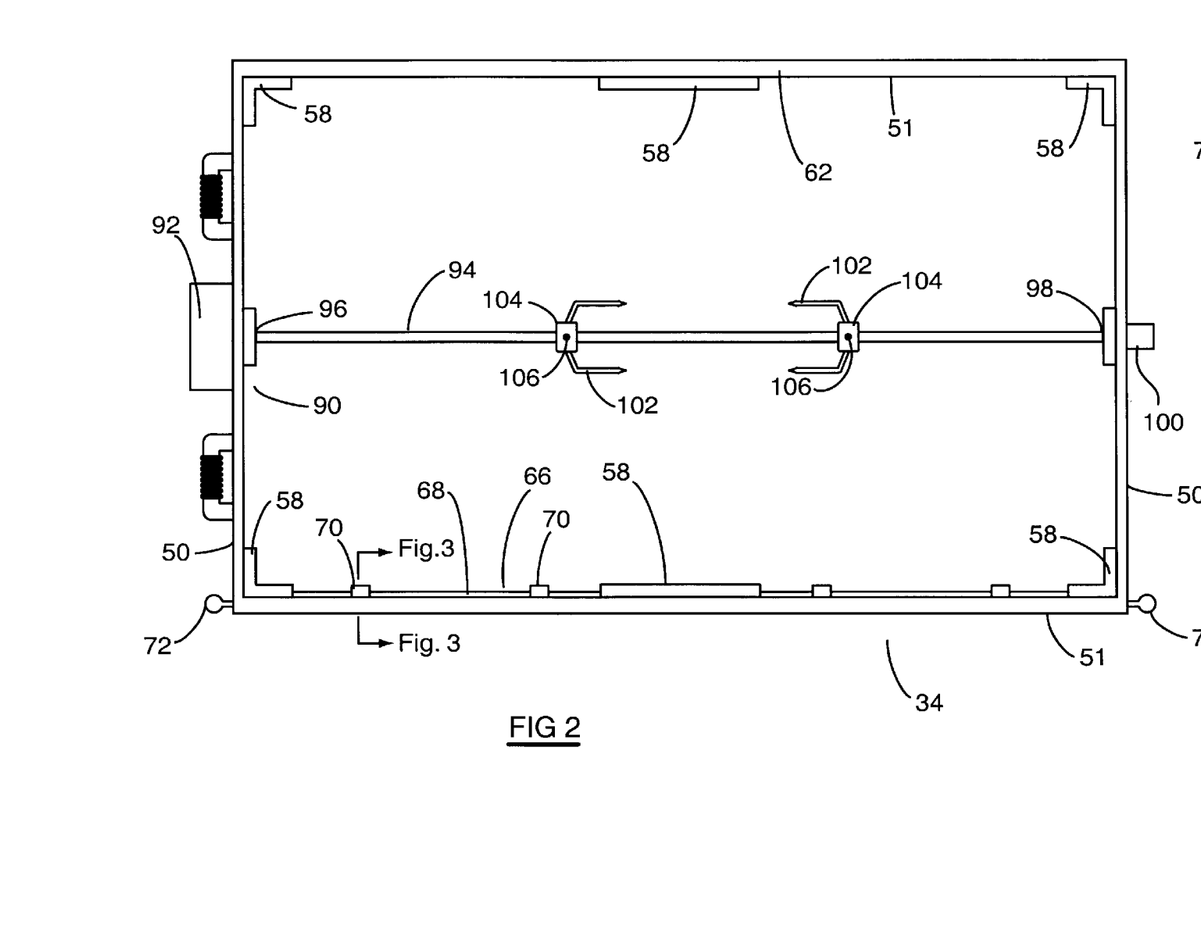
FIG. 2 is a top view of the base for the cover of FIG. 1.
Figure 3:
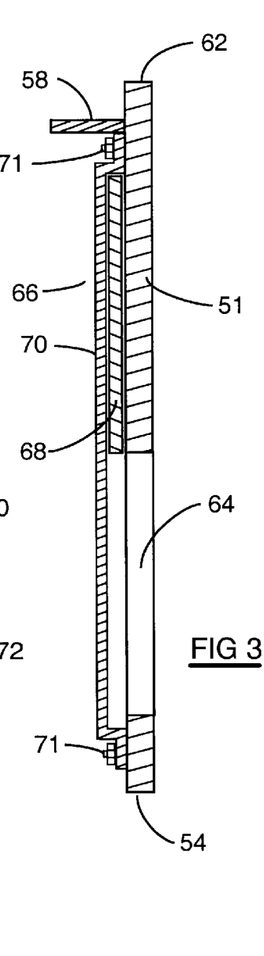
FIG. 3 is a sectional view of the base taken along lines 3—3 in FIG. 2.
Figure 4:
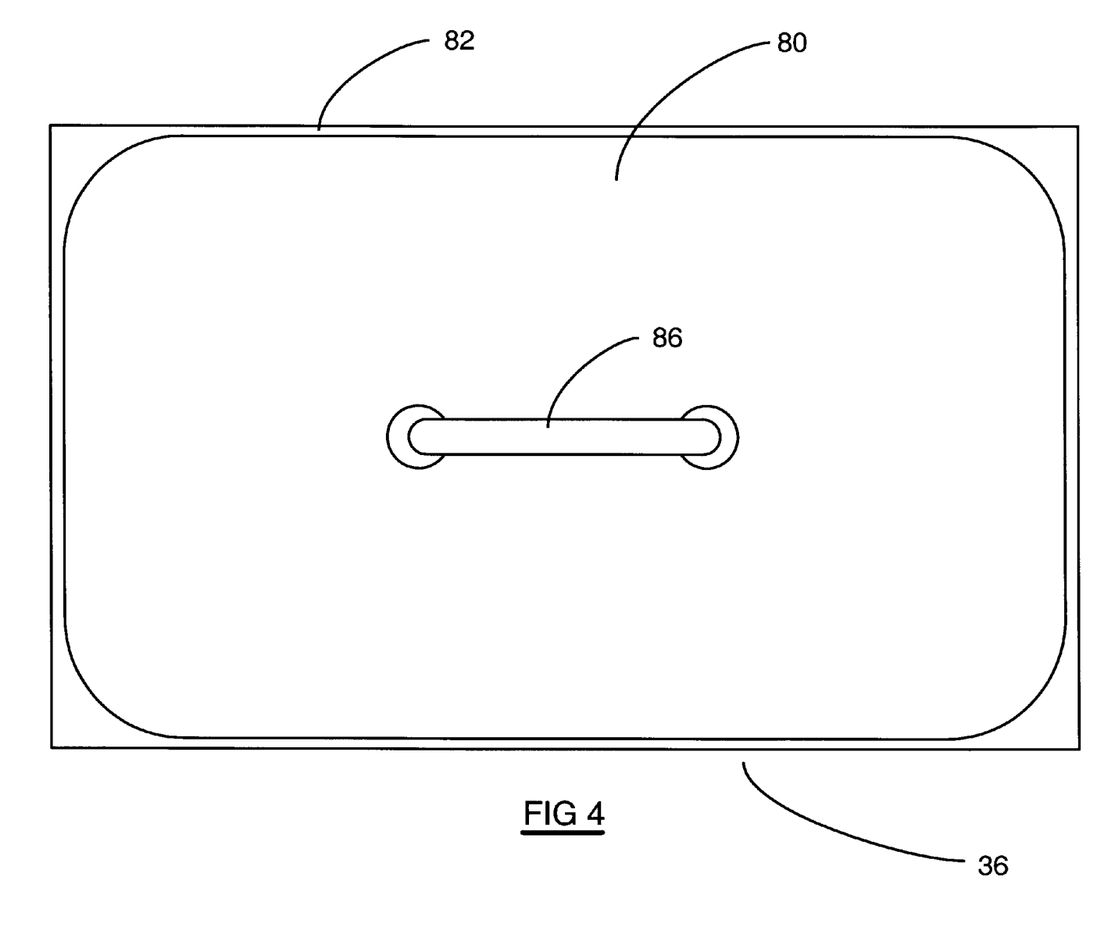
FIG. 4 is a top view of the lid of the cover of FIG. 1.
Figure 5:
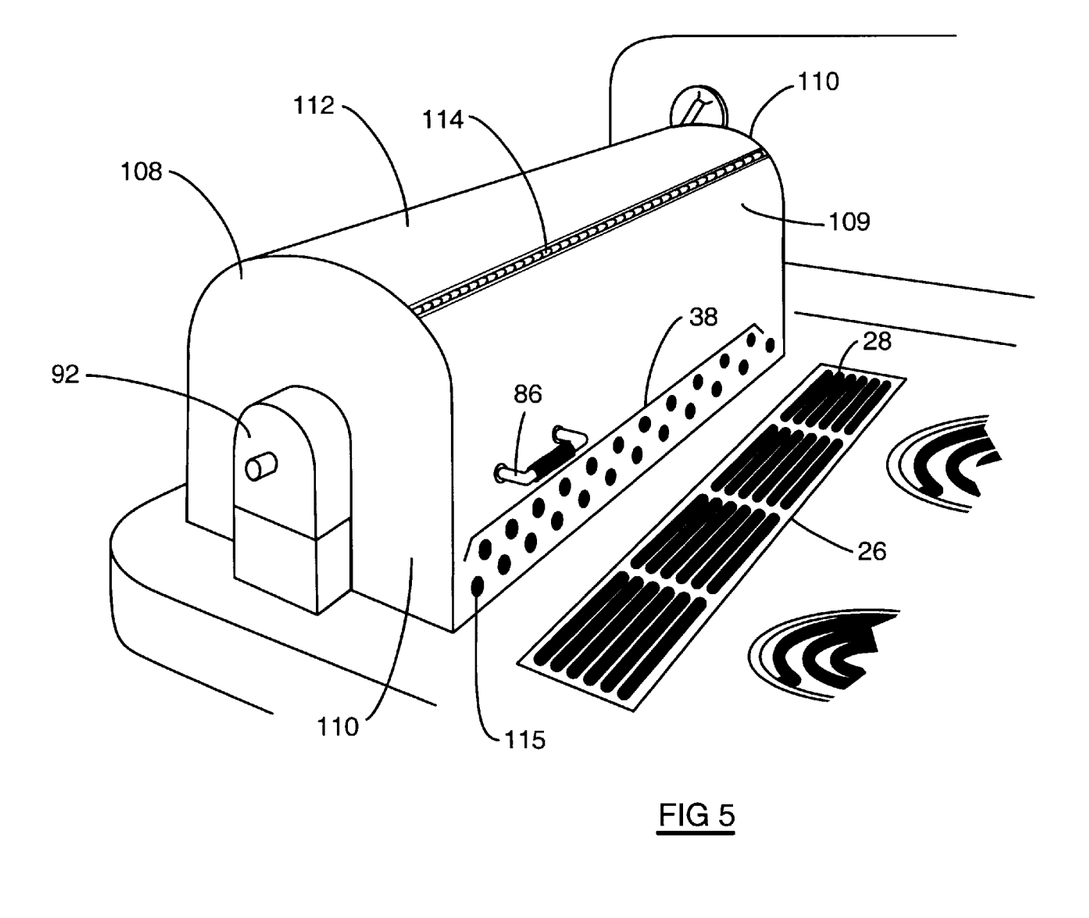
FIG. 5 is a top perspective view of a second embodiment of a grill cover in accordance with the present invention.
Figure 6:
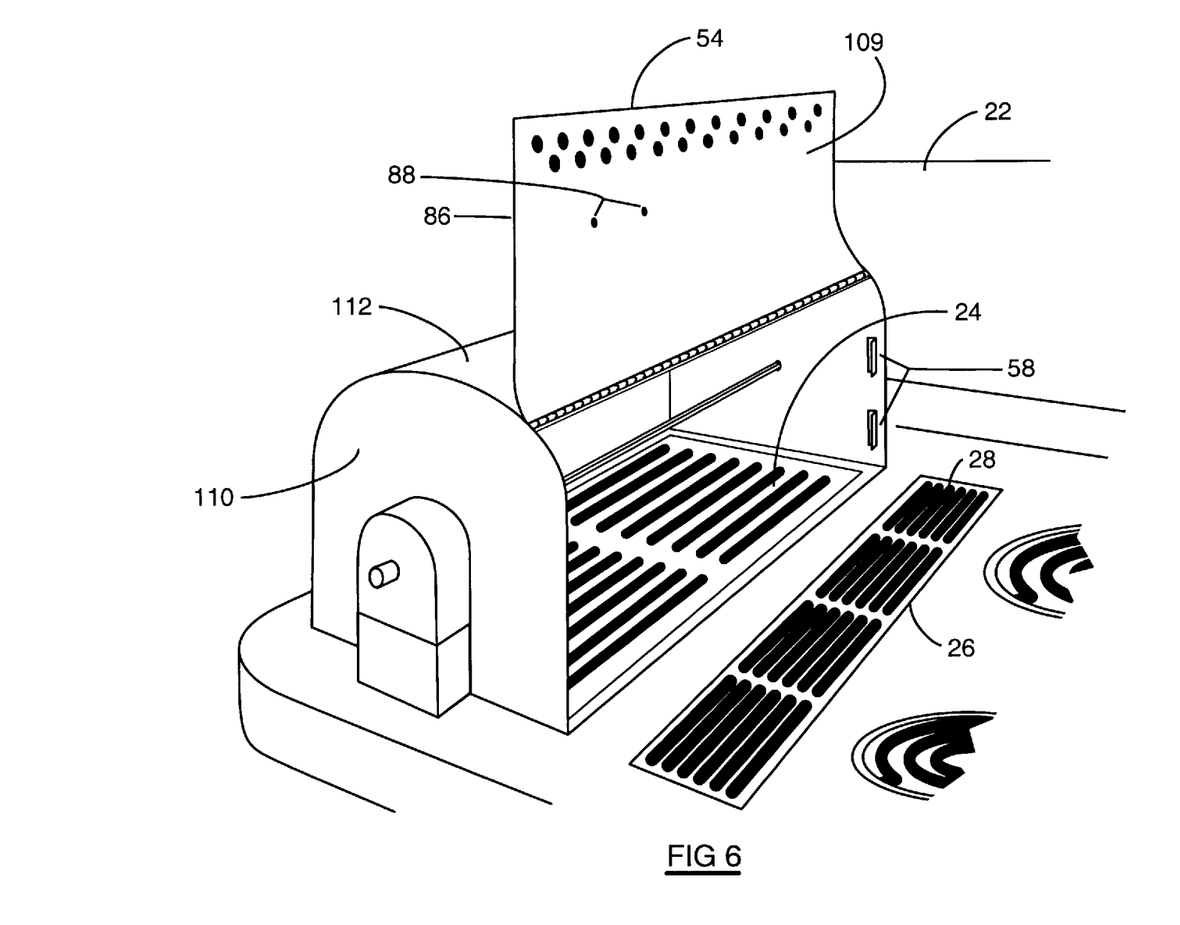
FIG. 6 is a top perspective view of the grill cover of FIG. 5 shown with the lid in an open position.

Referring to FIGS. 5 and 6, a second embodiment of the cover is shown. The enclosure 31 has a base 108 and lid 109. The base 108 has vertical end walls 110 and a curved side wall 112. The lid 109 is connected to the curved side wall 112 by an elongate hinge 114. The lid 109 is curved and sized to fit closely against support flanges 58 mounted to the vertical end walls 110 of the base 108. The handle 86 is positioned proximate to an end wall in order to be positioned at the front end of the appliance 22. This provides easy access to a user for lifting and lowering the lid 109. The vent 38 is defined along a lower portion of the lid 109 and comprises specifically a series of circular apertures 115.

Figure 7:
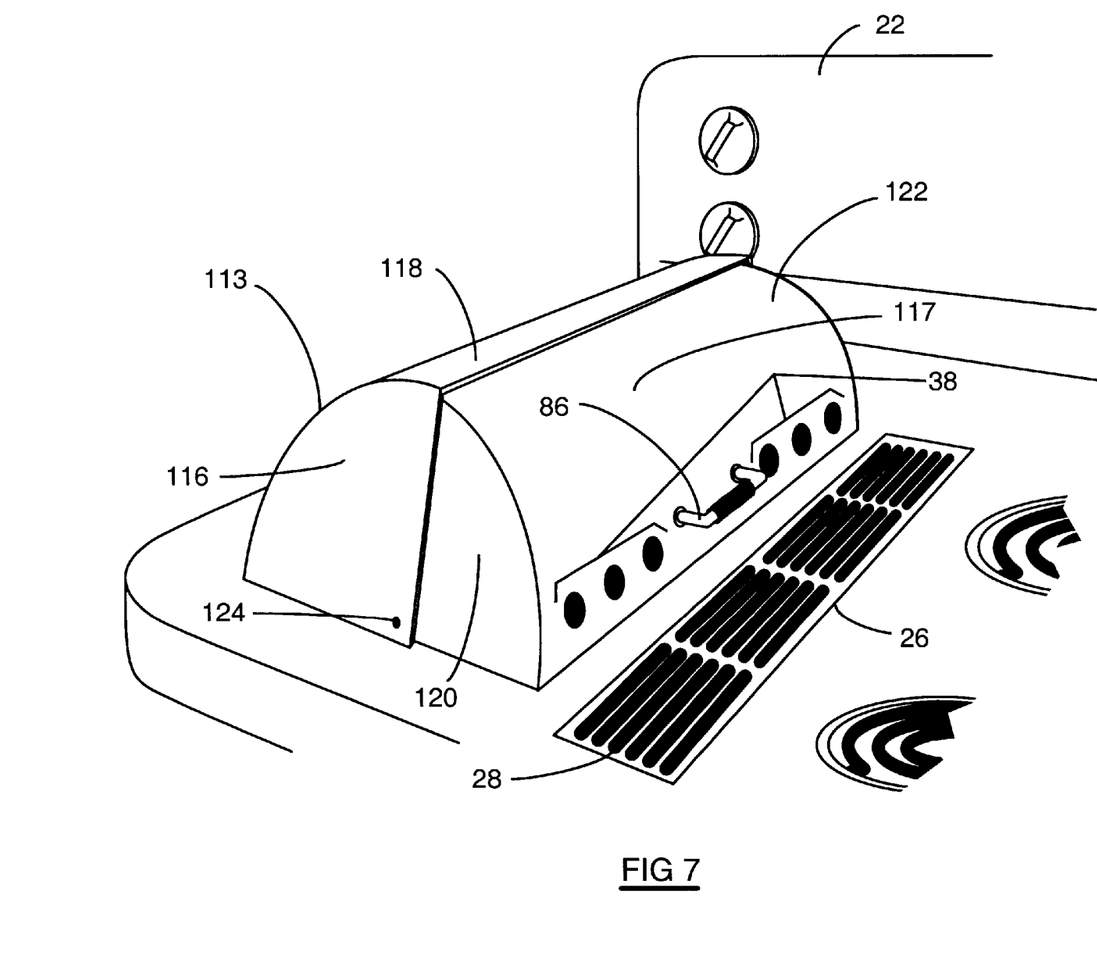
FIG. 7 is a top perspective view of a third embodiment of a grill cover in accordance with the present invention.
Figure 8:
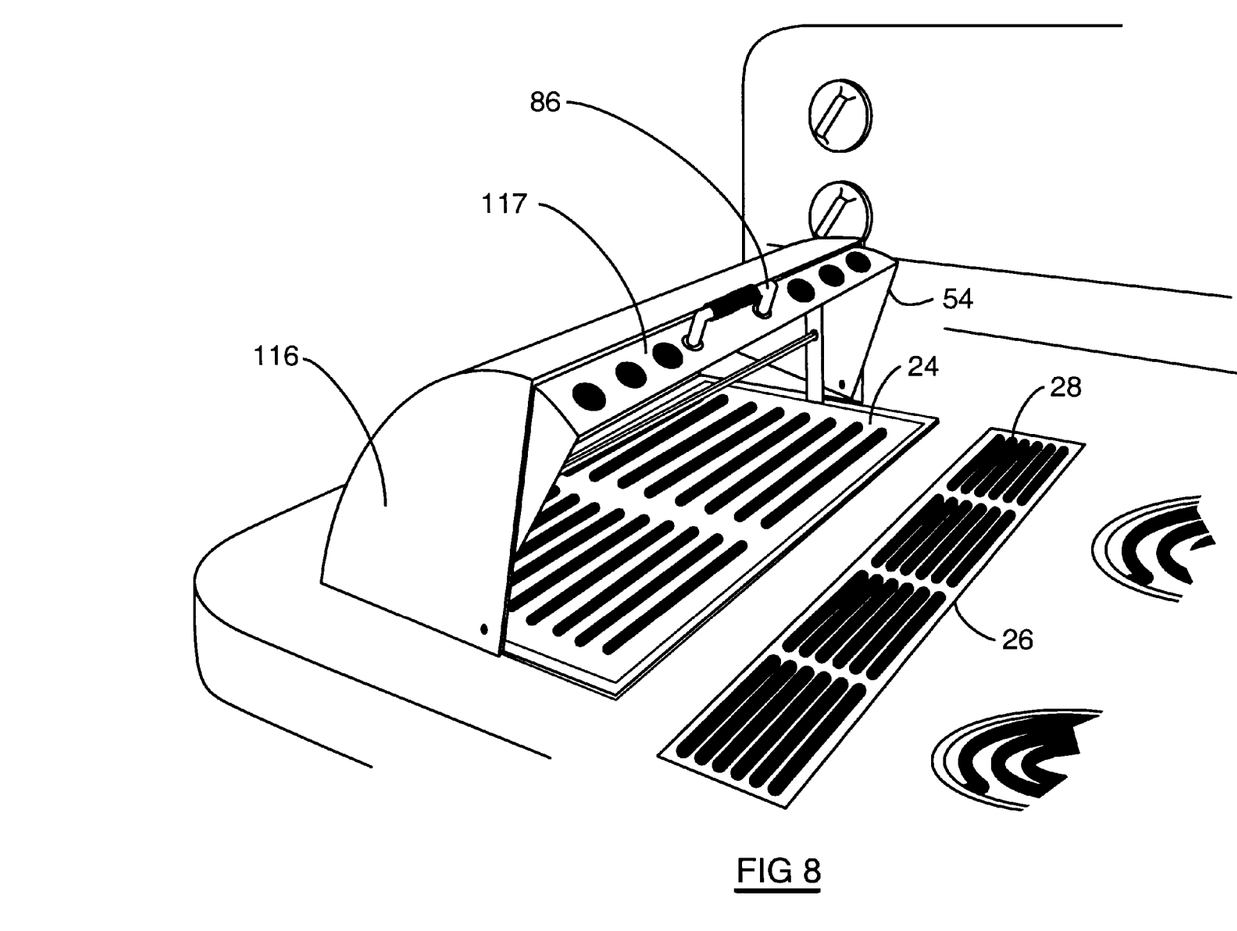
FIG. 8 is a top perspective view of the cover of FIG. 7 with the lid in an open position.

Referring to FIGS. 7 and 8, a third embodiment of the cover is shown. The enclosure 31 has a base 113 and a lid 117. The base 115 has vertical end walls 116 and a curved side wall 118. The lid 117 includes vertical end walls 120 and a curved side wall 122 that is sized to pivot into close engagement with the base 115. The lid 117 is connected at pivot points 124 to the vertical end walls 116 of the base 115. The handle 86 and vent 38 are both located at a lower edge of the curved side wall 122 of the lid 117.

Figure 9:
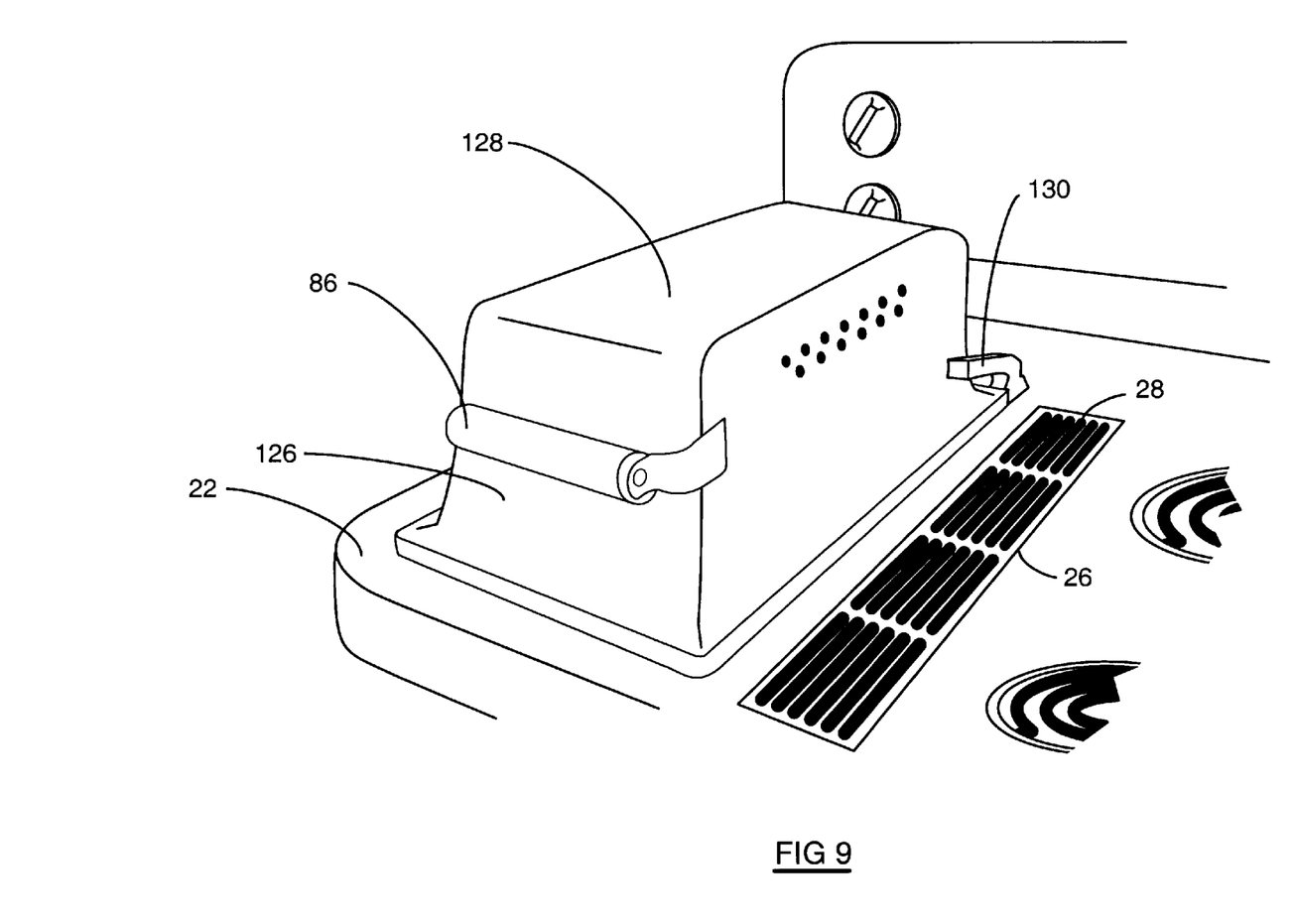
FIG. 9 is a top perspective view of a fourth embodiment of a cover in accordance with the present invention.
Figure 10:
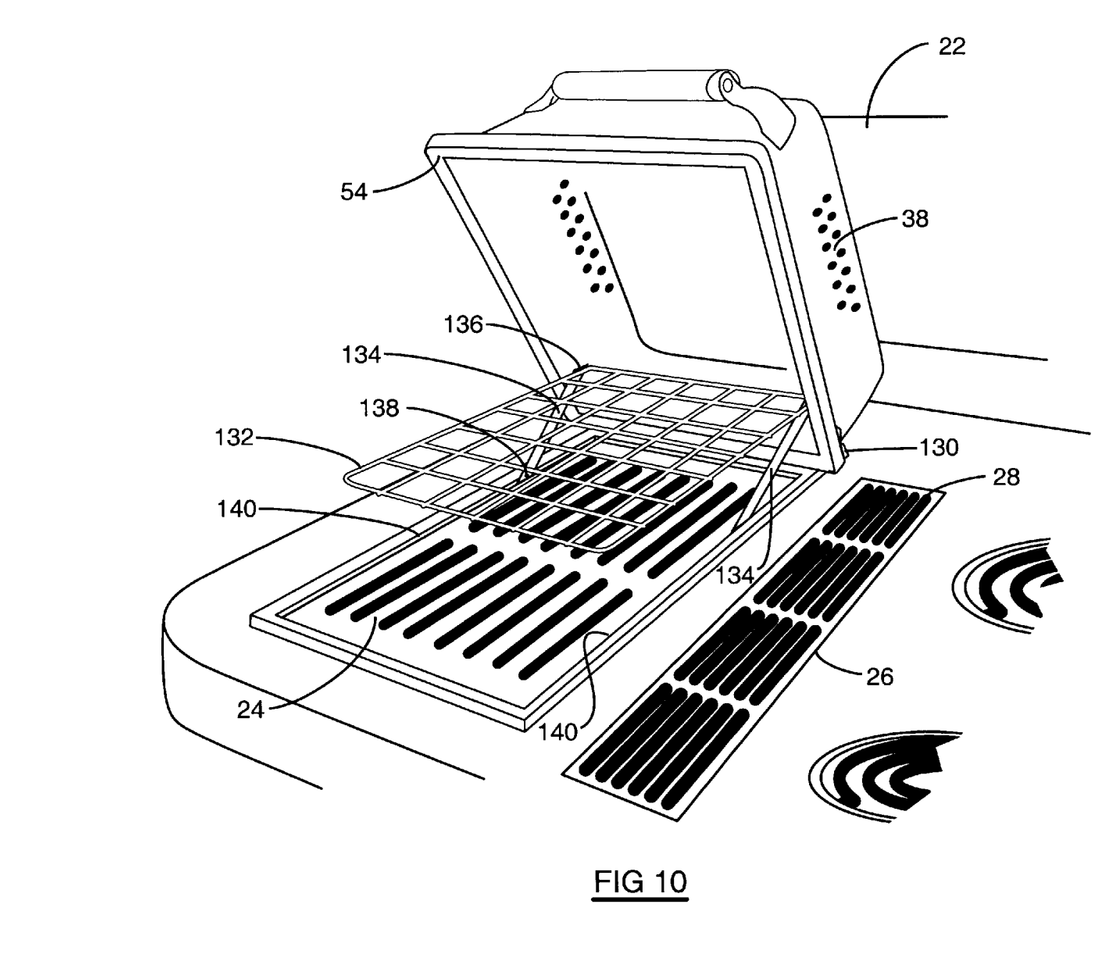
FIG. 10 is a top perspective view of the cover of FIG. 9 shown with the lid in an open position.

Referring to FIGS. 9 and 10, a fourth embodiment of the cover is shown. The enclosure 31 is integrally formed with a base portion 126 and a lid portion 128. The base portion 126 is pivotly connected to support arms 130 that are mounted to or rest upon the appliance 22. The handle 86 is located at the front end of the base portion 126 opposite to the end where the base portion 126 is pivotly connected to the support arms 130. The cover may thus be lifted by the handle 86 and pivoted on the support arms 130 to permit access to the grill surface. A rack 132 is supported in a cantilever arrangement on pivotal arms 134. One end of each arm is pivotly connected with a pin 136 to a lower edge of the base portion 126 and the other end of each arm is pivotly connected with a pin 138 to the inside edge 140 of the grill 24.

Figure 11:
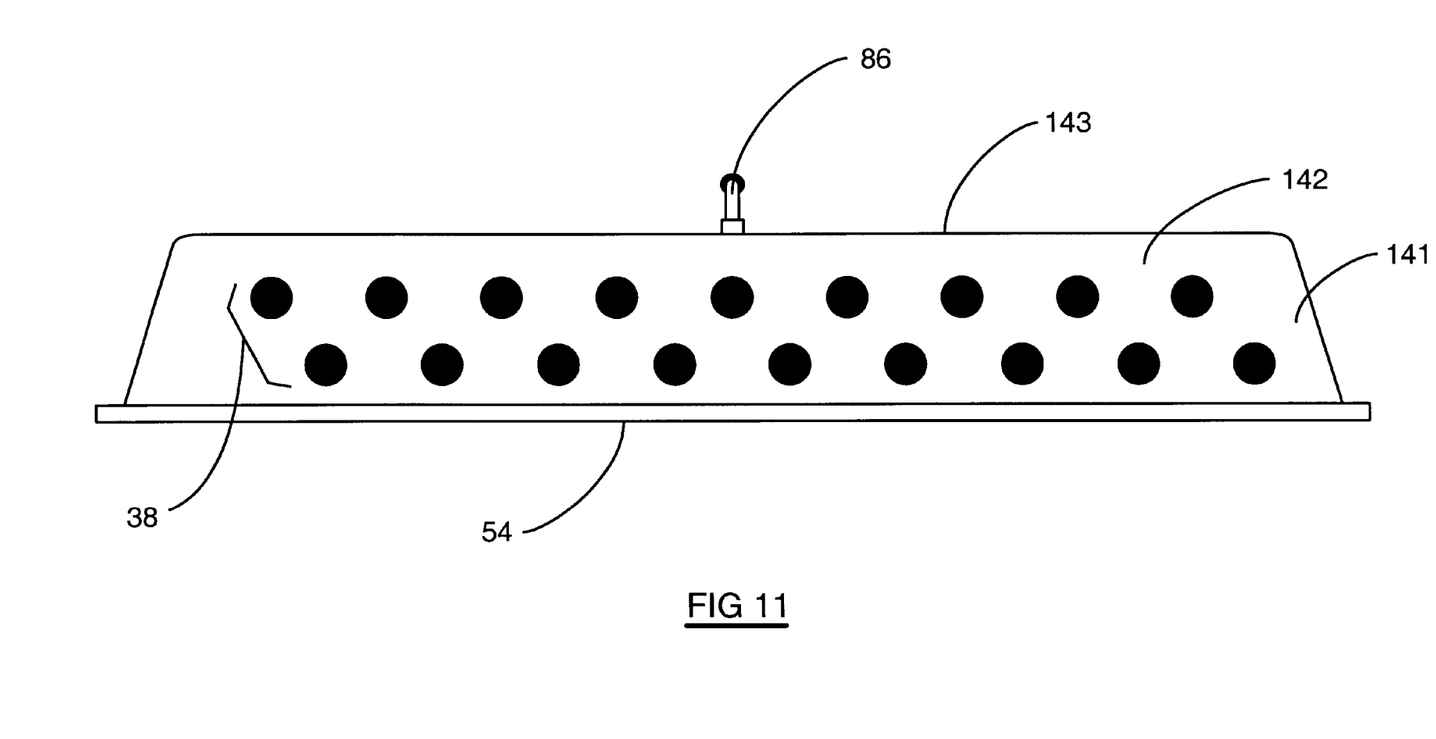
FIG. 11 is a side view of a fifth embodiment of a cover in accordance with the present invention.

Referring to FIG. 11, a fifth embodiment of the cover is depicted. The enclosure 31 is integrally formed with a base portion 141 and a lid portion 143. The vent 38 is defined in a side wall 142 of the base portion 141 in order to be positioned adjacent to the downdraft ventilator 26. The handle 86 is located on the lid portion 143 to permit the cover to be lifted away from the grill 24.

In use, a cover according to any one of the embodiments described above may be permanently or temporarily placed upon an appliance 22 over a grill 24. The cover will contain heat and smoke to speed up cooking time and improve the flavour of the food. The cover will also catch grease splatters from the food product 99 being cooked on the grill 24. The vent 38 will permit smoke to be drawn from the enclosed space 32 under the cover into the downdraft ventilator 26.

It is to be understood that what has been described is a preferred embodiment of the invention. The invention is nonetheless susceptible to certain changes and alternative embodiments fully comprehended by the spirit of the invention as described above, and the scope of the claims set out below.

I claim:

1. A cover for a grill, where the grill is equipped with a downdraft ventilator, said cover comprising:
    a heat resistant enclosure having a lid and a base, said lid being removably connected to said base, said enclosure being sized to enclose a sufficient portion of a grill surface to contain smoke and splatter generated during cooking, the grill surface remaining exposed within said enclosure to permit cooking thereon; and
    a vent defined in said enclosure at a position to permit a downdraft ventilator to draw away smoke from the space within the enclosure.

2. A cover as claimed in claim 1 wherein said lid is integrally connected to said base.

3. A cover as claimed in claim 1 wherein said lid is movably connected to said base.

4. A cover as claimed in claim 1 further comprising a rotisserie mechanism mounted to said base for supporting a food product above said cooking surface.

5. A cover as claimed in claim 4 wherein said rotisserie mechanism comprises an electric rotor mounted to said base and a spit horizontally supported on said base, one end of said spit being operatively connected to said rotor for rotation thereby.

6. A cover as claimed in claim 1 further comprising a vent cover mounted proximate to said vent for selectably opening or closing said vent.

7. A cover as claimed in claim 1 wherein said base comprises a continuous vertical wall surrounding the perimeter of the grill surface.

8. A cover as claimed in claim 1 wherein said base includes support flanges proximate to a top edge of said base, said support flanges supporting the edges of said lid.

9. A grill and grill cover combination for a grill equipped with a downdraft ventilator, said grill cover comprising:

a heat resistant enclosure having a lid and a base, said enclosure bring sized to enclose a sufficient portion of a surface of the grill to contain smoke and splatter generated during cooking; and a vent defined in said enclosure at a position to permit the downdraft ventilator to draw away smoke from the space within the enclosure.

10. A combination as claimed in claim 9 wherein said lid is integrally connected to said base.

11. A combination as claimed in claim 9 wherein said lid is movably connected to said base.

12. A combination as claimed in claim 9 further comprising a rotisserie mechanism mounted to said base for supporting a food product above the grill surface.

13. A combination as claimed in claim 12 wherein said rotisserie mechanism comprises an electric rotor mounted to said base and a spit horizontally supported on said base, one end of said spit being operatively connected to said rotor for rotation thereby.

14. A combination as claimed in claim 9 further comprising a vent cover mounted proximate to said vent for selectably opening or closing said vent.

15. A combination as claimed in claim 9 wherein said base comprises a continuous vertical wall surrounding the perimeter of the grill surface.

16. A combination as claimed in claim 9 wherein said base includes support flanges proximate to a top edge of said base, said support flanges supporting the edges of said lid.

17. A combination as claimed in claim 9 wherein said lid is removably connected to said base.

\* \* \* \* \*